No. 815,016. PATENTED MAR 13 1906.
P. L. T. HÉROULT.
PROCESS OF SMELTING IRON ORE.
APPLICATION FILED JUNE 14, 1905.
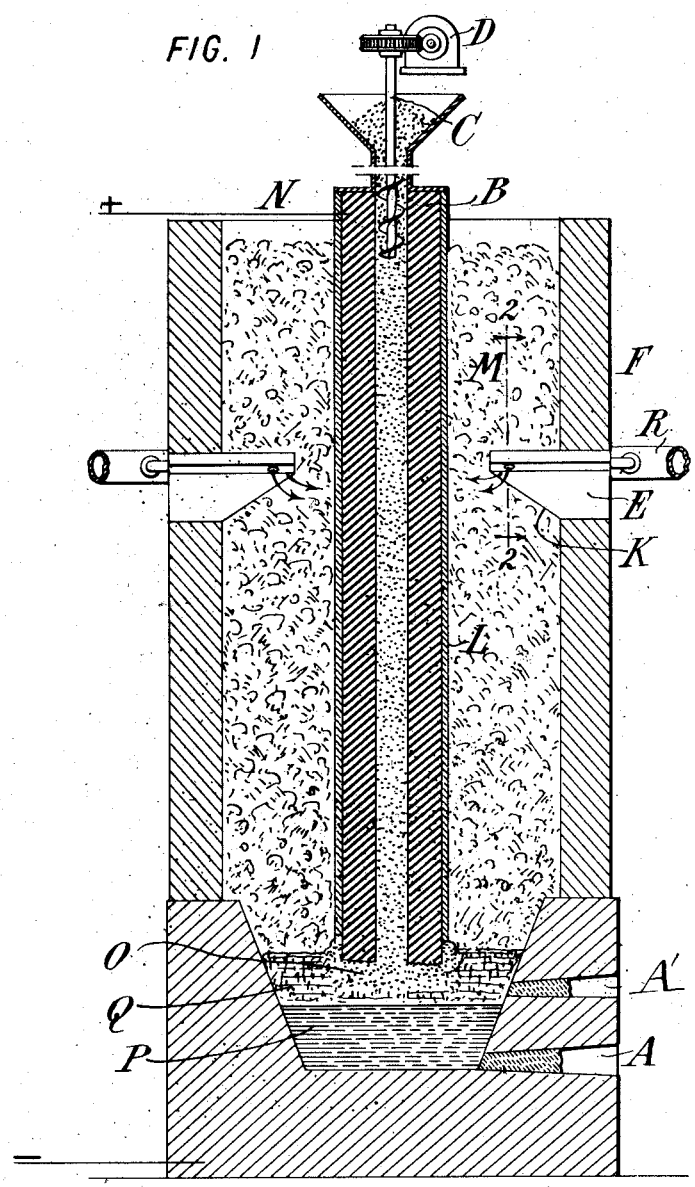
FIG. 2.
WITNESSES: INVENTOR:
Paul Louis Toussaint Héroult,
By Attorneys,

UNITED STATES PATENT OFFICE.

PAUL LOUIS TOUSSAINT HÉROULT, OF LA PRAZ, FRANCE, ASSIGNOR TO SOCIÉTÉ ELECTRO METALLURGIQUE FRANCAISE, OF FROGES, ISÈRE, FRANCE, A CORPORATION OF FRANCE.

PROCESS OF SMELTING IRON ORE.

No. 815,016.      Specification of Letters Patent.      Patented March 13, 1906

Application filed June 14, 1905. Serial No. 265,175.

*To all whom it may concern:*

Be it known that I, PAUL LOUIS TOUSSAINT HÉROULT, a citizen of the Republic of France, residing at La Praz, Savoie, France, have invented certain new and useful Improvements in Processes of Smelting Iron Ore, of which the following is a specification.

This invention aims to provide an improved process for the smelting of iron ores to make pig-iron, the particular aim of the invention being to increase the caloric efficiency of the carbon used in the smelting. In previous processes the ore has been introduced at the top of the furnace mixed with carbon. At the base of the furnace, where the greatest heat has been and the greatest chemical activity, carbon monoxid and carbon dioxid have been formed in varying proportions. The mixture of gases passing up through the charge has then done very little to reduce the ore, the carbon mixed throughout the charge gradually increasing the percentage of carbon monoxid, so that the gases escaping at the top have been largely of carbon monoxid. Thus the carbon mixed throughout the charge has been largely burned to produce a gas having a high potential heat energy, and this heat energy has been lost to the furnace and only utilized in external apparatus to which the gas has been led.

The aim of the present process is to insure that the gas escaping at the top of the furnace shall be all or as much as possible carbon dioxid—that is to say, all the heat units developed by the carbon shall be developed within the furnace. The carbon is consumed only in the smelting-chamber, being protected by its manner or point of introduction from the $CO_2$ generated in the smelting-chamber. The consequence is a very large reduction in the quantity of carbon necessary to be fed to the furnace. As an example of the most efficient manner of carrying out the process the carbon may be introduced at the base of the charge and the latter fed into the top of the furnace without admixture of carbon. Thus a mixture of carbon monoxid and carbon dioxid will be formed at the base of the furnace, and as this mixture of gases passes upward through the charge there will be no further consumption of carbon, but a further reduction of the iron ore and a conversion of part of the carbon monoxid into dioxid. At a certain height, however, the mixture of gases is so diluted with carbon dioxid as to have substantially no further reducing effect. At this point, as nearly as it can be determined, additional oxygen will be supplied to the ascending gases and all, or at least a great part, of the remaining monoxid will be converted into dioxid, the heat produced by the combination serving to heat the charge above. Preferably the heat necessary for melting the iron is supplied by the electric current, so that only so much carbon will be needed as is necessary for effecting the reduction of the ore. The higher the point at which the injection of oxygen (preferably in the form of air) takes place the greater will be the utilization of the reducing power of the carbon monoxid, though such reducing power is a diminishing quantity. The lower the injection the greater the heat developed and the less the reduction of ore. The most efficient point can be readily determined by experiment for each particular case, it being only necessary to avoid introducing the oxygen at so low a point as to make the ore above pasty. There is no exact limit to the height to which the point of oxidation may be raised, though, as stated, the efficiency of the injected oxygen becomes less as the point of injection is raised.

As an illustration of the economy effected by this process, take one kilo of iron to be reduced from the ore, $(Fe_2O_3)$. The reduction requires about sixteen hundred and forty calories. To obtain this quantity of heat it is necessary to burn only two hundred grams of carbon to the dioxid, $(CO_2)$. In addition the process requires sufficient heat to melt the iron and slag or for one kilo of iron two hundred and fifty calories and for one-half a kilo of slag two hundred and fifty calories, a total of five hundred calories. Two hundred grams of carbon and one horse-power (six hundred and thirty calories) will therefore effect the reduction and melting and provide an excess of one hundred and thirty calories for losses by radiation and the heat escaping with the gases. The economy of this as compared with the ordinary process, where one kilo of carbon is used in producing one kilo of iron, is very great. If instead of an electric furnace an ordinary furnace be employed heated by carbon injected at the base, there will be required about three hundred grams of carbon in place of the one horse-power in the above example in order to melt the iron and slag. The carbon may be introduced in any suitable form—such, for example, as a pulverized solid—or a liquid or a gas and either pure or mixed with other elements.

I have also designed a furnace which is specially adapted to the carrying out of the above process and which is illustrated in the accompanying drawings.

Figure 1 of the drawings is a central vertical section. Fig. 2 is a cross-section on the line 2 2 of Fig. 1.

Referring to the specific form illustrated, the furnace is provided with an open upper end to permit the introduction of the ore at the top and with tap-holes A A' for withdrawing the iron and slag at the bottom. Provision is made for introducing the carbon at the bottom by the use of a hollow electrode B, through which pulverized carbon is forced down by means of a screw C, driven from a motor D. The provision for introducing oxygen comprises nozzles E, passing through the wall F and preferably of the shape shown in Fig. 2, with orifices G extending downward and protected from entrance of ore by an overhanging portion H, the nozzle being also provided with a tapered upper edge J to divide the charge and with a lower inclined portion K for strength. The electrode B is provided with an iron shell L, which burns away at the lower end, but which protects the electrode above the lower end from being eaten away by the carbon dioxid rising through the charge. With this furnace the charge M of ore is introduced at the top and gradually moves downward and contains substantially no mixture of carbon. The carbon N is all introduced through the hollow protected electrode, preferably in pulverized form, and forms at the base a sort of mushroom O, surrounding the lower end of the electrode and serving, in fact, as the working electrode. The molten metal P collects at the bottom and is drawn off from time to time through the tap-hole A, as usual. The molten slag Q floats on the top of the molten metal P and shades gradually into the solid charge above. The oxygen of the ore is extracted by combining with the carbon, while the iron is melted and trickles in drops through the lower part of the charge and the slag to the pool beneath. The carbon monoxid and dioxid formed with the oxygen of the ore then pass upward through the ore, taking oxygen therefrom in gradually-diminishing quantities. There being no carbon present in the charge, there is no reduction of the dioxid to monoxid, such as takes place in the ordinary furnaces at present generally used. On the contrary, the full reducing effect of the monoxid is obtained, and when the mixture of gases is no longer strong enough to extract any substantial part of the oxygen from the ore the remaining monoxid is burned by the oxygen entering through the nozzles E and develops a large quantity of heat which heats the portion of the charge above the nozzles, and therefore renders the furnace as a whole more economical. The oxygen, in the form of pure oxygen, air, or any gas containing oxygen, may be forced into the nozzles E through a ring R surrounding the nozzles.

The improved furnace is not here claimed, being claimed in my copending application, Serial No. 277,466, filed September 7, 1905.

Though I have described with great particularity of detail certain embodiments of this invention, yet it is not to be understood therefrom that the invention is limited to the specific embodiments disclosed.

Various modifications may be made by those skilled in the art without departure from the invention.

What I claim is—

1. In the smelting of iron ore, the process which consists in feeding the ore, introducing carbon at the base of the charge while protecting it from the action of the carbon dioxid generated by the smelting operation, whereby a mixture of carbon monoxid and carbon dioxid is formed of gradually-increasing richness in carbon dioxid as the gases rise to the point at which the reduction of ore substantially ceases, and introducing oxygen at such point to further oxidize the carbon monoxid and increase the heating effect in the furnace.

2. In the smelting of iron ore, the process which consists in feeding the ore, introducing carbon at the base of the charge while protecting it from the action of the carbon dioxid generated by the smelting operation, and introducing oxygen at a higher point to further oxidize the carbon monoxid formed and increase the heating effect in the furnace.

3. In the smelting of iron ore, the process which consists in feeding the ore, introducing carbon at the base of the charge sufficient to produce the chemical reactions necessary while protecting it from the action of the carbon dioxid generated by the smelting operation, and supplying the necessary heat by means of the passage of an electric current, and introducing oxygen at a higher point to further oxidize the carbon monoxid formed at the base and to increase the heating effect in the furnace.

In witness whereof I have hereunto signed my name in the presence of two subscribing witnesses.

PAUL LOUIS TOUSSAINT HÉROULT.

Witnesses:
DOMINGO A. USINA,
FRED WHITE.